Patented Mar. 2, 1926.

1,575,561

UNITED STATES PATENT OFFICE.

GUSTAVUS J. ESSELEN, JR., OF SWAMPSCOTT, MASSACHUSETTS, ASSIGNOR TO UNITED FRUIT COMPANY, OF BOSTON, MASSACHUSETTS, A CORPORATION OF NEW JERSEY.

DECOLORIZING AND DEFECATING PRODUCT AND PROCESS OF MAKING THE SAME.

No Drawing. Application filed October 6, 1922. Serial No. 592,887.

*To all whom it may concern:*

Be it known that I, GUSTAVUS J. ESSELEN, Jr., a citizen of the United States of America, residing at Swampscott, in the county of Essex and State of Massachusetts, have invented certain new and useful Improvements in Decolorizing and Defecating Products and Processes of Making the Same, of which the following is a specification.

This invention relates to a novel decolorizing and defecating product derived, so far as its carbon component is concerned, from the isolated pith component of the sugar-cane, and to the process of manufacturing the same.

It has often been proposed to prepare a decolorizing carbon from the woody residue from the milling of sugar-cane (bagasse); but these efforts have not been commercially successful. This is in part due to the inferior decolorizing power of the bagasse carbon as compared with vegetable carbons derived from certain other available sources and activated by suitable treatment; and in part to the presence in bagasse of a rather fusible ash, which tends to slag down at the high temperatures of the carbonizing operation.

In a copending application of Jesse B. Trinler, Serial No. 388,212, filed June 11, 1920, there is disclosed an improved decolorizing carbon derived principally from the isolated pithy component of the sugar-cane; and it has been found that such carbon is decidedly more active as a decolorizing agent than carbons derived in a similar manner from bagasse; which latter includes not only the pithy component of the cane, but the fibrous or rind portion as well. Moreover, the ash of the cane is to a considerable extent concentrated in or near the rind; so that in the preparation of bagasse carbon it has been found desirable to effect the carbonization in presence of lime or other mineral extenders which act to retard the sintering tendency of the ash. In the case of the isolated pith, which is a relatively low-ash material, the use of mineral extenders is not necessary for this purpose.

I have discovered however that a superior decolorizing and defecating product may be prepared by preliminarily digesting the isolated pith component with an alkali, preferably milk of lime; and thereafter carbonizing the pith in presence of the lime, the temperature during the carbonizing treatment, or at the close of the carbonizing treatment, being sufficiently high to causticize a certain proportion at least of the lime.

In preparing my novel decolorizing material I prefer to proceed as follows:

Sugar cane pith, largely or substantially isolated from the fibrous component of the cane, is mixed with finely divided caustic lime, either hydrated or anhydrous, and sufficient water is added to convert the mass into a paste. This paste is then warmed, preferably to 80–100° C. The exact duration of this treatment is not material, but one hour has been found sufficient to produce the desired effect, which is evidenced by a certain swelling or hydration of the fibers, similar to the effect of a lime cook in the paper industry.

The lime-cellulose mixture is then carbonized, after being dried out in a preliminary operation if desired. The carbonization may be carried out in a continuous operation wherein the material is charged into any suitable retort and heated gradually to a full carbonizing temperature, preferably about 800°–900° C. I prefer however to carry out the operation in two operating stages, the mixture being first heated to redness or somewhat less in a rotary gas-fired furnace to carbonize the pith; and thereafter further heated in a muffle, which may be electrically heated, to 800–900° C., this latter temperature being maintained until the decolorizing properties of the product are sufficiently developed. In practice approximately one hour has been found sufficient for this purpose.

Under these conditions a certain proportion of the lime, which has been converted into carbonate during the earlier heating stages, is causticized; but under my preferred operating conditions the heating is not sufficient to causticize the whole, or even the major portion of the lime. While the proportions in the final product of carbon, calcium carbonate and caustic lime may be widely varied within the scope of my invention, I will cite as an example of a typical product which has proven satisfactory for the decolorization of sugar juices: calcium carbonate 71%; caustic lime, calculated as calcium hydroxide, 14%; and carbon, by difference, 15%.

I have found in practice that the relative proportions of lime and sugar cane pith may be widely varied. In fact I have found that proportions varying from about one part of lime to eight parts of pith on the one hand, to sixteen parts of lime to eight parts of pith on the other hand, all yield valuable decolorizing products. I now prefer however to use lime and pith in the approximate proportions of one part of quick lime (or one and one-third parts of hydrated lime), to four parts of sugar cane pith. The proportion of water in the paste is kept as low as practicable in order to economize heat in the subsequent steps of the process.

The same effect that is obtained by the use of caustic lime and water when warmed with the pith, may also be obtained by the use of sugar cane pith admixed with finely divided calcium carbonate, and moistened with a very dilute solution of caustic soda or caustic potash, the mixture being warmed as described above.

The decolorizing and defecating product prepared as above described does not require acid or other treatment in order to prepare it for use; and it exhibits excellent decolorizing and filtering qualities. The fact that it contains lime renders it possible to carry out with its aid in one step, certain refining and purifying processes which involve the use of lime or other alkalis, and which previously have been carried out in two operating stages; and moreover the single step process is a decidedly simpler operation. In many instances moveover it is desirable to employ decolorizing agents in neutral or non-acid solution, whereas a number of decolorizing materials now on the market contain traces of acids, which are extracted by the solution in connection with which they are used. My novel decolorizing and defecating product not only contains no free acid, but because of the presence of calcium carbonate and lime as an integral component of the material, any free acid which may be carried by the solution is automatically neutralized. The product is used with particular advantage in the decolorization of sugar solutions, either of the refinery or of the plantation type. In this particular application I prefer to introduce into the sugar solution, coincidently with the lime-carbon product, an amount of phosphoric acid substantially equivalent to its caustic lime component; but this is not essential to the utilization of the decolorizing and defecating product.

A marked advantage possessed by my novel product is that it can be readily revivified, by merely washing with water, and thereafter heating to 800° C. or higher as in the original process of manufacture. This method of revivification applies of course to those cases in which the material has been used in conjunction with aqueous solutions, and is decidedly simpler than the revivification processes required for the more common active decolorizing carbons now on the market, most of which require an alkaline treatment.

I claim:

1. The hereindescribed decolorizing and defecating product comprising a decolorizing carbon derived principally from the isolated pithy component of the sugar cane, intimately associated with an alkaline material.

2. The hereindescribed decolorizing and defecating product comprising a decolorizing carbon derived principally from the isolated pithy component of the sugar cane, intimately associated with a calcareous material.

3. The hereindescribed decolorizing and defecating product comprising a decolorizing carbon derived principally from the isolated pithy component of the sugar cane, intimately associated with calcium carbonate and caustic lime.

4. The process of making a decolorizing and defecating product, which consists essentially in digesting a cellulosic material consisting principally of the isolated pithy component of the sugar cane with an alkaline reagent, and thereafter carbonizing the cellulosic material in presence of said reagent.

5. The process of making a decolorizing and defecating product, which consists essentially in digesting a cellulosic material consisting principally of the isolated pithy component of the sugar cane with an alkaline reagent comprising a calcium compound, and thereafter carbonizing the cellulosic material in presence of said reagent.

6. The process of making a decolorizing and defecating product, which consists essentially in digesting a cellulosic material consisting principally of the isolated pithy component of the sugar cane with an alkaline reagent comprising a calcium compound, and thereafter carbonizing the cellulosic material in presence of said reagent and to a temperature sufficient to causticize calcium carbonate.

In testimony whereof, I affix my signature.

GUSTAVUS J. ESSELEN, Jr.